United States Patent
Salazar (10) Patent No.: US 12,485,985 B1
(45) Date of Patent: Dec. 2, 2025

(54) ADJUSTABLE BICYCLE SADDLE

(71) Applicant: Nicholas M Salazar, Parker, CO (US)

(72) Inventor: Nicholas M Salazar, Parker, CO (US)

( * ) Notice: Subject to any disclaimer, the term of this patent is extended or adjusted under 35 U.S.C. 154(b) by 0 days.

(21) Appl. No.: 19/299,534

(22) Filed: Aug. 14, 2025

(51) Int. Cl.
*B62J 1/10* (2006.01)
*B62J 1/00* (2006.01)
*B62J 1/08* (2006.01)
*B62J 1/04* (2006.01)

(52) U.S. Cl.
CPC ............. *B62J 1/005* (2013.01); *B62J 1/08* (2013.01); *B62J 1/04* (2013.01); *B62J 1/10* (2013.01)

(58) Field of Classification Search
CPC ....... B62J 1/005; B62J 1/08; B62J 1/04; B62J 1/06; B62J 1/10
See application file for complete search history.

(56) References Cited

U.S. PATENT DOCUMENTS

| | | | |
|---|---|---|---|
| 9,637,193 B1 * | 5/2017 | Porter | B62J 1/06 |
| 9,663,166 B2 * | 5/2017 | Hamel | B62J 1/007 |
| 10,118,658 B2 | 11/2018 | Petty | |
| 10,750,872 B2 | 8/2020 | Petty | |
| D905,982 S | 12/2020 | Petty | |
| 11,603,154 B2 | 3/2023 | Petty | |
| D1,009,493 S | 1/2024 | Petty | |
| 12,005,982 B2 * | 6/2024 | Petty | B62J 1/10 |
| 12,060,128 B2 | 8/2024 | Petty | |
| 2017/0073028 A1 | 3/2017 | Petty | |
| 2019/0069679 A1 | 3/2019 | Petty | |
| 2020/0307730 A1 | 10/2020 | Petty | |
| 2020/0385077 A1 | 12/2020 | Petty | |
| 2022/0289325 A1 | 9/2022 | Petty | |
| 2024/0383553 A1 | 11/2024 | Petty | |

* cited by examiner

*Primary Examiner* — Syed A Islam
(74) *Attorney, Agent, or Firm* — Leyendecker & Lemire, LLC (57) ABSTRACT

A lightweight adjustable bicycle saddle that permits a user to make several critical adjustments to maximize the rider's comfort when seated on the saddle in one or more desired positions is described. The adjustments are relatively easily made using simple tools, such as a hex head wrench, with both rapidity and repeatability and are resistant to creep once the adjustments are set. Furthermore, the left and right sides of the panel can be adjusted independently permitting riders to adjust each side for any asymmetry between the rider's left and right legs and buttocks as well as his/her riding style.

20 Claims, 10 Drawing Sheets

ADJUSTABLE BICYCLE SADDLE

BACKGROUND

Bicycle saddles (often referred to as "seats") have historically comprised a unitary elongated shell or pan covered by padding and a pair of parallel seat rails that are fixed to the front and rear (or nose and tail) of the pan and facilitate the attachment of the saddle to a clamp comprising the head of a seatpost. The fore-aft position of the saddle relative to the bicycle can be adjusted a few inches by sliding the rails in the seatpost clamp. The tilt of the saddle can typically be adjusted by pivoting the seatpost. Saddle height is adjusted by sliding the seatpost within the bicycle frame. While these basic adjustments accommodate gross rider fit, conventional saddles present a fixed geometry across their width. As a result, the contact relationship between the rider's ischial tuberosities ("sit bones"), perineal soft tissue, and saddle surface is largely predetermined by the saddle's manufacturer, rather than being tunable for individual anatomy, riding discipline, or dynamic riding postures.

Adjustable saddles that permit more substantive geometry changes, such as the saddles front and rear width, are known. By way of example, U.S. Patent Application Publication No. 2024/0383553 describes a bicycle saddle assembly having user-adjustable components for tailoring support. While such systems provide enhanced configurability relative to fixed saddles, they often incorporate relatively complex adjustment systems that are both costly to manufacture and potentially time consuming to accurately adjust to the desired position of a particular rider. In practice, many of these adjustable saddles appear to target recreational or comfort-oriented riders-users who may prioritize plush padding and broad adjustability ranges over low weight, rapid repeatable setup, and mechanical robustness under the high dynamic loads encountered in racing, interval training, and triathlon transitions.

DETAILED DESCRIPTION

Embodiments of the present invention comprise lightweight adjustable bicycle saddles that permit a user to make several critical adjustments to the saddle to maximize the rider's comfort when seated on the saddle in one or more desired positions. The adjustments are relatively easily made using simple tools, such as a hex head wrench, with both rapidity and repeatability and are resistant to creep once the adjustments are set. Furthermore, the left and right sides of the panel can be adjusted independently permitting rider's to adjust each side for any asymmetry between the rider's left and right legs and buttocks as well as his/her riding style.

One embodiment of the saddle comprises an elongated main rail with ends for fixedly receiving the seat rails. The main rail comprises a plurality of aligned and spaced main rail fastener holes. A mounting bracket is secured to the main rail by at least two fasteners passing through the main rail fastener holes and being threadably secured into one or both of two main rail fastener holes and aligned two bracket fastener holes in the mounting bracket. Left and right seat pans are independently and adjustably secured to the mounting bracket through additional fasteners passing through additional bracket fastener holes and laterally-extending pan slots in the respective left and right seat pans. By pivoting the pans and then tightening the fasteners to secure the pans in place, the left and right seat pans can be positioned both for the anatomy of the rider as well as his/her riding position helping ensure both comfort and maximum rider output.

Terminology

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive, rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, upper, lower, vertical, horizontal, back, front, lateral, outwardly, and upwardly are relative to each other and are dependent on the specific orientation of an applicable element or article, and are used accordingly to aid in the description of the various embodiments and are not necessarily intended to be construed as limiting.

Unless otherwise indicated or dictated by context, the terms "generally", "approximately" and "about" mean +−20% and/or wherein the percentage deviation is not quantifiable, the terms mean for the most part as this would be understood by the relevant person of ordinary skill in the art. Unless otherwise indicated or dictated by context, the term "substantially" means+−10%.

As used herein the "longitudinal axis" refers to an axis that bisects the main rail of the saddle. The "lateral" direction is one substantially orthogonal to the longitudinal direction or longitudinal axis.

A First Embodiment of an Adjustable Bicycle Saddle

Figure 1:
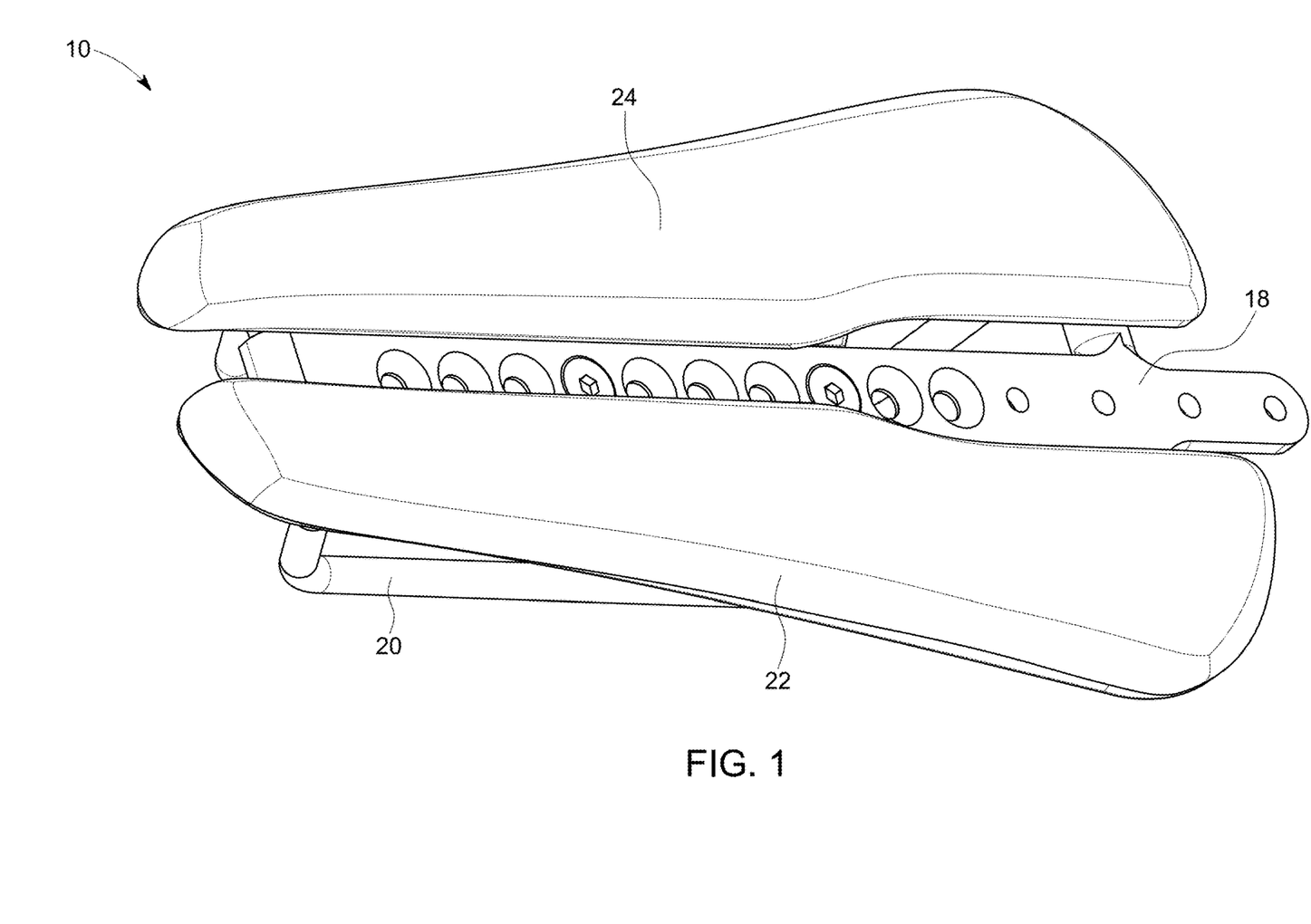
FIG. 1 is a perspective top view of an adjustable saddle according to a first embodiment of the present invention.
Figure 2:
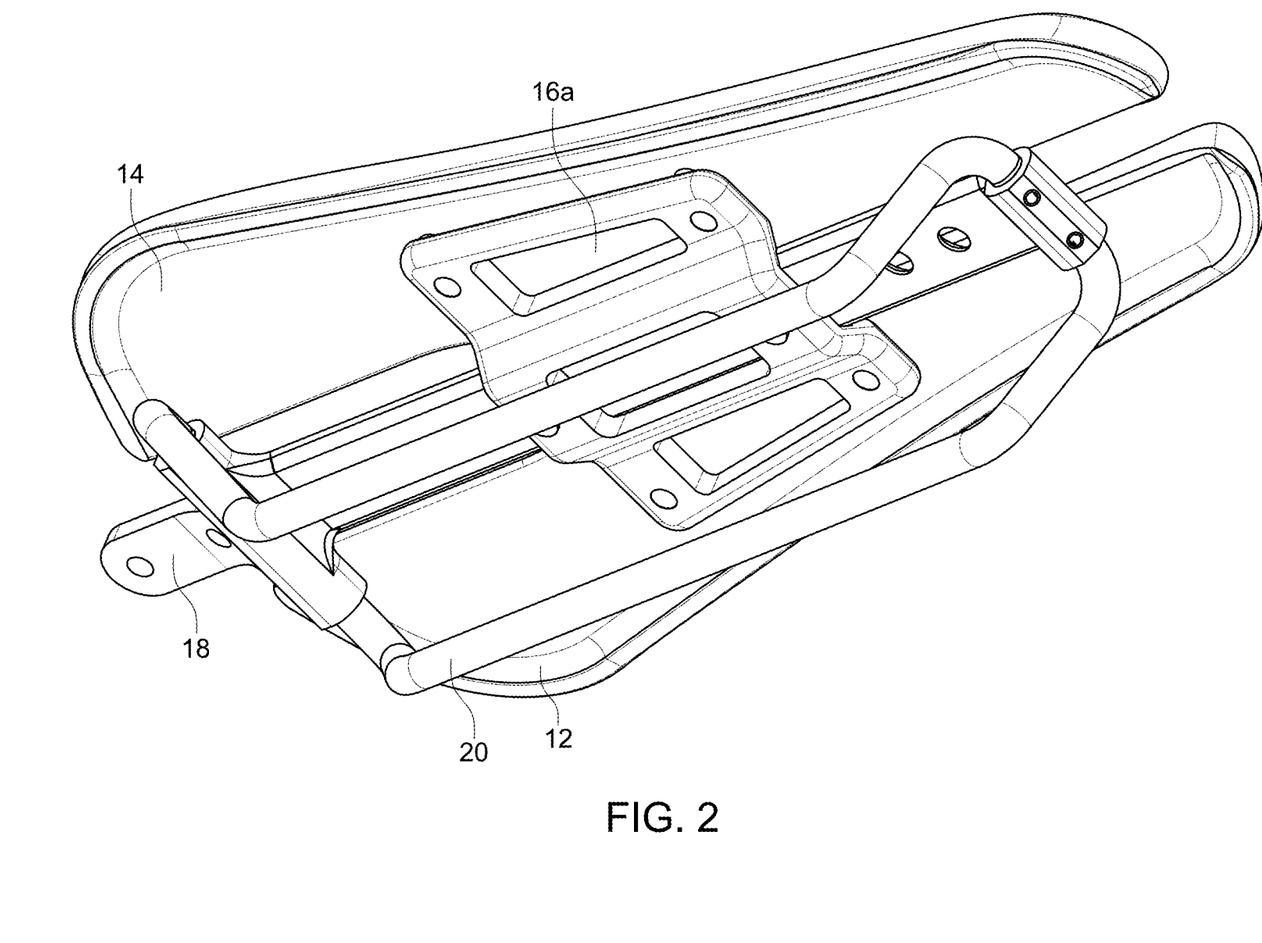
FIG. 2 is a perspective bottom view of the adjustable saddle according to the first embodiment of the present invention.
Figure 3:
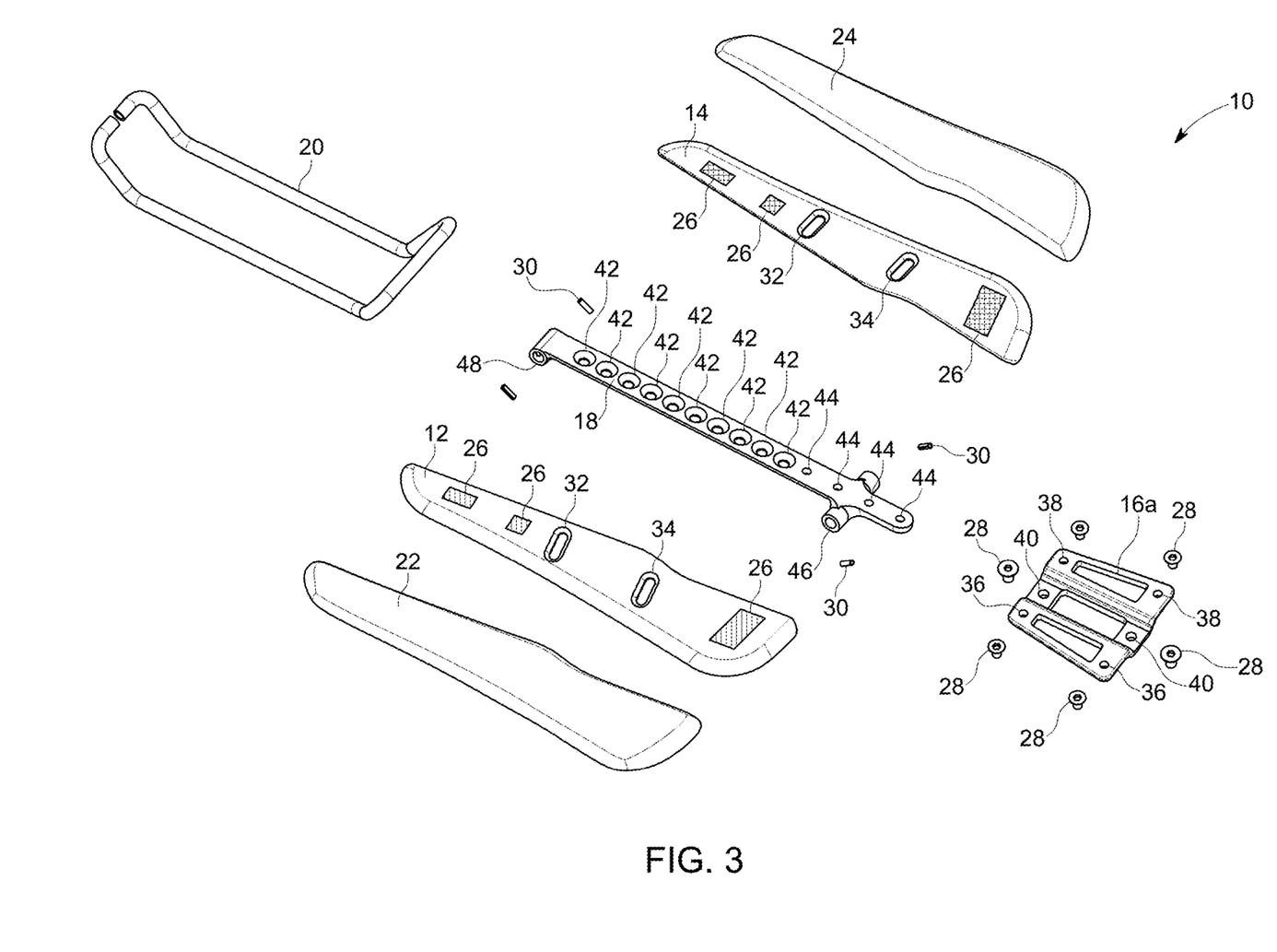
FIG. 3 is an exploded perspective view of the adjustable saddle according to the first embodiment of the present invention.

FIG. 1-3 provide an illustration of a first embodiment of an adjustable bicycle saddle 10. The primary components the embodiment as best shown in the exploded view of FIG. 3 are: (1) a left pan 12 and a right seat pan 14, (2) a mounting bracket 16a to which the respective seat pans are adjustably secured; (3) a main rail 18 to which the bracket is secured in a desired fore and aft position; and (4) left and right seat rails 20 that can be provided in a single piece or two pieces and are affixed to the main rail. Most variations further include left and right seat pad assemblies 22&24 that are removably attached to the respective left and right seat pans.

Figure 6:
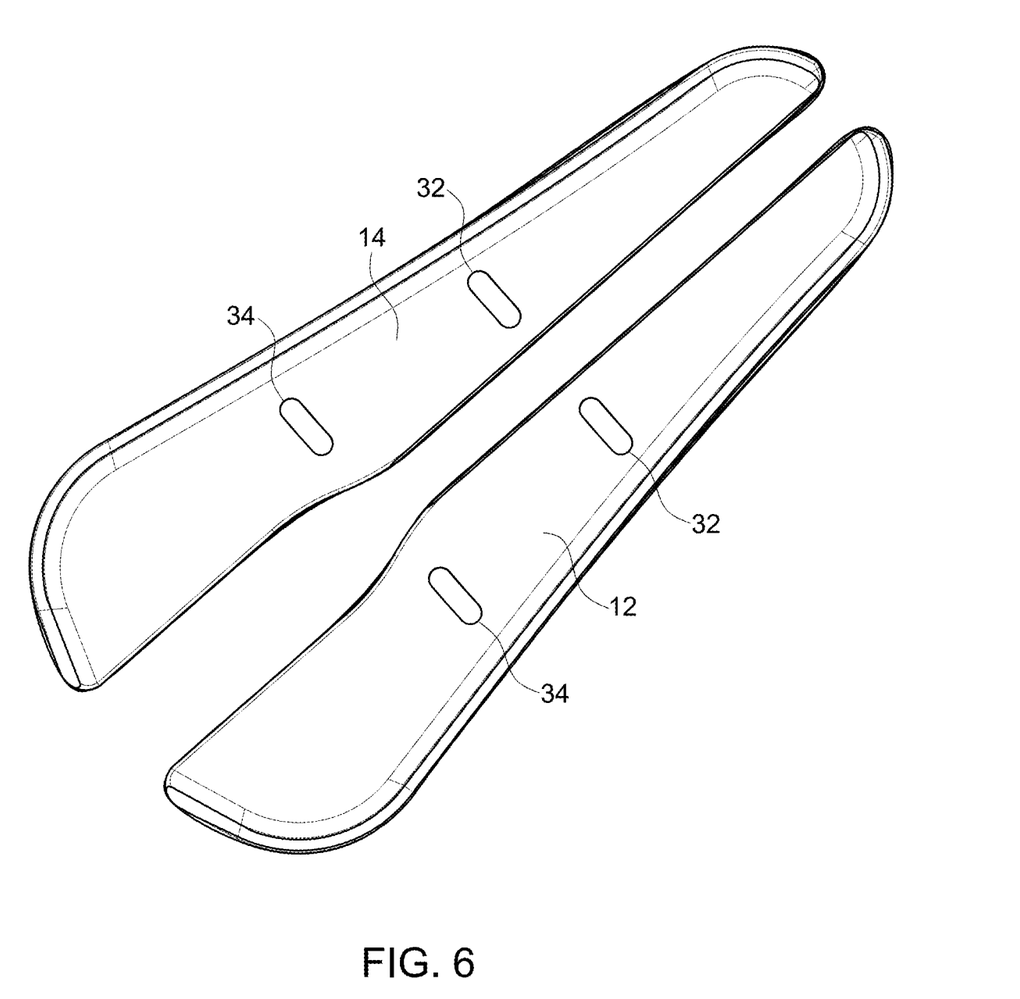
FIG. 6 is a bottom view of the left and right pans according to an embodiment of the present invention.

A perspective bottom view of the left and right seat pans 12&14 is shown in FIG. 6. The seat pans can be made from any suitable material using any suitable manufacturing process. In a typical saddle, the seat pans can be made of a reinforced or unreinforced polymer such as nylon. Other variations can be made from an advanced composite of a continuous high strength fiber, such as carbon, aramid, glass or polyethylene fiber, in mat or fabric form that is contained in a polymeric matrix, such as an epoxy. Pans made of metal, such as thin titanium or steel sheet are also known.

The seat pans are generally plate-like, i.e. relatively thin versus their width and length, and can be manufactured using a number of different process depending on the material and/or material system of which they are comprised. For instance, the polymeric pans can be injection or press molded, and the advanced composite pans can be resin transfer molded or composite forged.

Each pan comprises and elongated section that is narrower at a front nose and wide at the tail to accommodate the ischial tuberosities of a rider. The pans together substantially resemble a prior art saddle pan bisected longitudinally. In the central portion each pan, a pair of spaced apart ovular front and rear seat pan fastener holes 32 & 34 are provided. The front and rear ovular seat pan fastener holes are configured to align with left and right bracket fastener holes 36 & 38 provided in the mounting bracket 16a to facilitate the use of associated threaded bracket fasteners 28 to join the pans the respective left and right sides of the mounting bracket.

The pair of ovular seat pan fastener holes 32&34 on each of the left and right seat pans permits the pan to be moved laterally inwardly and outwardly as well as pivot the nose and rear inwardly and outwardly relative to each other. As can be appreciated each seat pan is independently adjustable relative to the other permitting each side of the saddle to be adjusted for the particulars of the rider's anatomy. Once the seat pan is positioned as desired the associated bracket fasteners 28, of which the tapered head typically butts against the surface of the pan surrounding the slot, is tightened in the typically threaded associated bracket fastener holes 36 & 38 to secure the pans in place. In one variation of the illustrated embodiment, the slotted ovular seat pan fastener holes are about 15-20 mm long permitting the pans to be moved laterally about 10-15 mm, and to pivot about 5-10 degrees.

Figure 7:
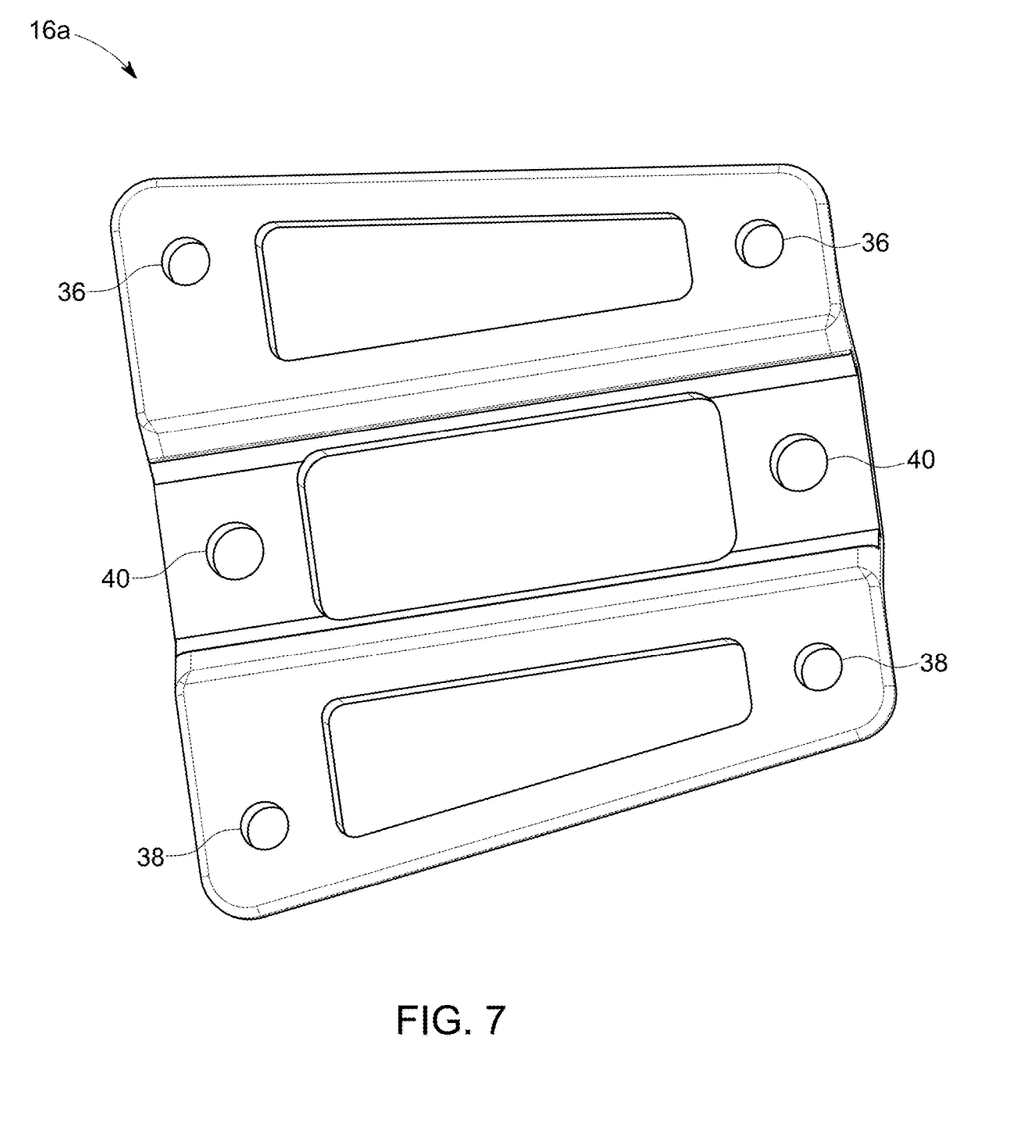
FIG. 7 is a top view of butterfly bracket according to the first embodiment of the present invention.

A perspective top view of the mounting bracket 16a is shown in FIG. 7. The mounting bracket 16a is typically made from an aluminum alloy, but variations comprised of a reinforced plastic or forged carbon fiber composite are also contemplated as are other suitable materials. The bracket tapers from rear to front generally following the taper of the seat pans 12 & 14 from tail to the nose. Further, the bracket includes a longitudinally-extending center channel in to which the main rail is received and secured. Six bracket fastener holes 36, 38 & 40 are provided and they are typically threaded to receive the associated bracket fasteners 28. As described above, the front and back holes of the left and right pairs of fastener holes 36 & 38 are used in affixing the left and right seat pans to the mounting bracket. The center bracket fastener holes 40 located in the channel are secure the mounting bracket to the main rail 18.

In one embodiment concerning a saddle having left and right seat rails 20 spaced apart about 44 mm center to center, the front and back holes of the left and right pairs of fastener holes 36 & 38 are spaced apart about 60 mm with the left pair of fastener holes 36 spaced from the right pair of fastener holes 38 by about 45-55 mm. The relative closeness of the front and back fastener holes compared with the length of a typical seat pan 12 & 14 (about 270 mm) permits a significant amount of pivotal movement of the nose and tail of each pan relative to both the other pan and the main rail 18.

Figure 8:
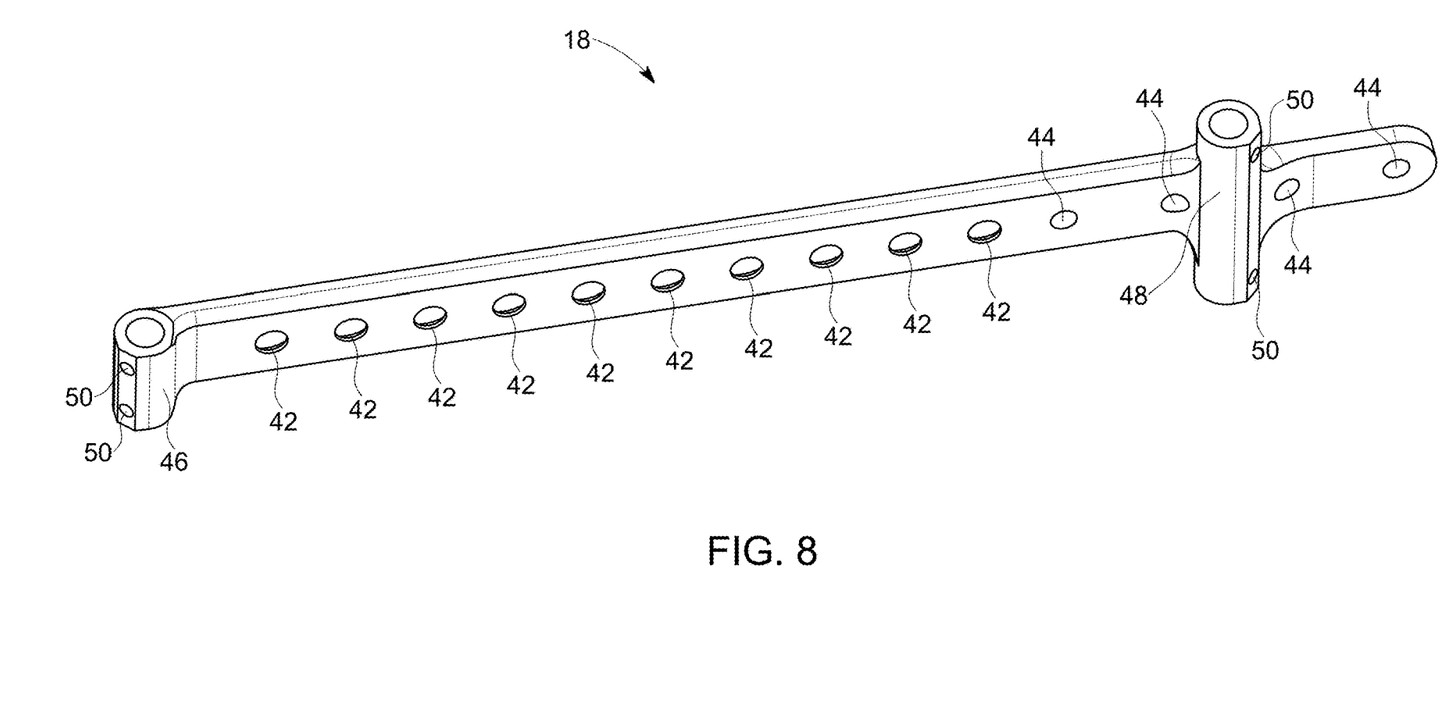
FIG. 8 is a bottom perspective view of the main rail according to the first embodiment of the present invention.

A perspective bottom view of the main rail 18 is shown in FIG. 8. The rail can be made of any suitable material including aluminum or titanium allow and carbon fiber composite using any suitable manufacturing technique, such as casting, machining, forging and resin transfer molding. The rail is an elongate member defining a longitudinal axis. Aligned and spaced along the axis are a plurality of main fastener holes 42 of which two are typically used to secure the mounting bracket 16a to the rail. As can be seen in FIG. 1, the main fastener holes are typically countersunk on the top side to permit the corresponding heads of the bracket fasteners 28 to be flushly received therein. Ten main fastener holes are shown but the number can vary. Towards the back end of the rail, four accessory mounting holes 44 are provided. These holes, which may be threaded, can be used to secure an accessory, such as the water bottle mount assembly 60 shown in FIGS. 9 & 10.

As can best be seen in FIGS. 1 & 2, the main rail 18 is received in the mounting bracket's longitudinally-extending channel and secured in place at a desired location along the main rail using two bracket fasteners 28 received through the desired main fastener holes 42 and threaded into the corresponding center bracket fastener holes 40.

A laterally-extending front sleeve 46 is provided at the front of the main rail and a corresponding laterally-extending rear sleeve 48 is provided proximate the rear end of the main rail. These sleeves with cylindrical shafts are configured to receive the seat rails 20 therein. On each of the front and rear sleeves a pair of radial bores 50 extend from the sleeve's surface into the corresponding shaft. The radial bores are each configured to receive one of a set screw or set pin 30, which are used to hold the seat rails in place.

The left and right seat rails 20 are shown in the exploded view of FIG. 3 and can be seen as assembled into the saddle in FIG. 2. The left and right seat rails as illustrated comprise a single piece of formed rod or tubing with facing ends. The single piece seat rails can be fed through the sleeves 46 &

48 into the desired assembly configuration and then secured in place using set screws or pins 50. In some variations, the seat rails can comprise separate left and right pieces wherein the ends of each are received in the corresponding side of the sleeve and secured in place with the set pins or screws. As can further be appreciated the configuration of the rails and the mounting locations on the main rail can vary.

In some variations of the saddle 10, the left and right seat pans 12 & 14 can be unpadded with the user sitting directly on the respective pan's top surface; however, in most variations, the cushion assemblies 22 & 24 are provided that cover the top surfaces of the pans. Left and right cushion assemblies are shown in FIG. 3 and typically comprise a layer of foam that is covered with a fabric and/or real or synthetic leather. On the bottom side of the assembly one or more strips of hook and loop strips can be provided that correspond to hook and loop fabric strips 26 provided on the top of the left and right seat pans 12 & 14 allowing the cover assemblies to be quickly and easily coupled and detached from the underlying pans. As can be appreciated, the removal of the cover is necessary in certain variations to access the heads of the bracket fasteners 28 secured in the ovular seat pan fastener holes 34, so that the positioning of the seat pans can be adjusted as desired by a user. Other means of securing the cushion assemblies to the seat pans are contemplated including, but not limited to snaps and straps.

A Second Embodiment of an Adjustable Bicycle Saddle

Figure 4:
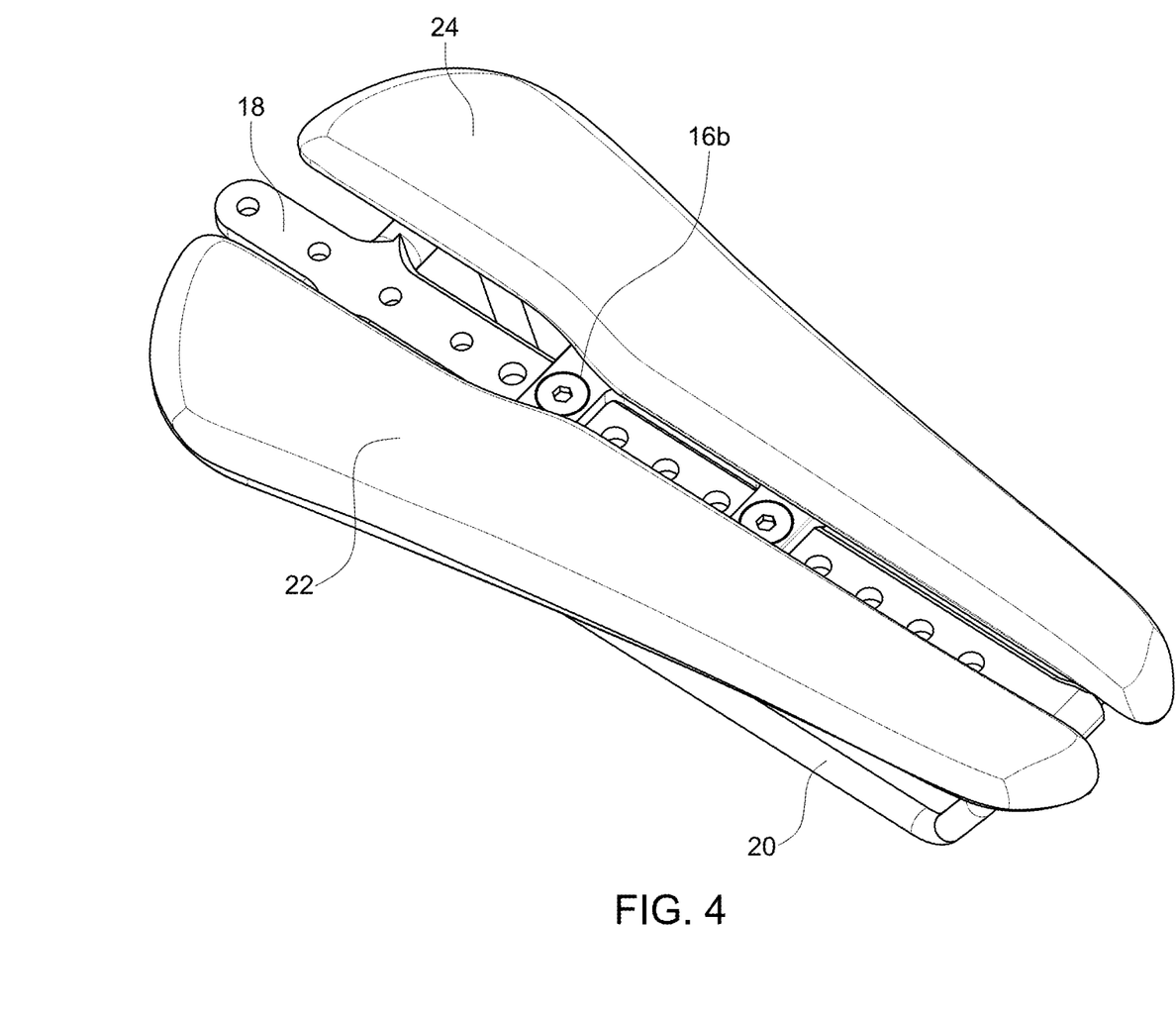
FIG. 4 is a perspective top view of an adjustable saddle according to a second embodiment of the present invention.
Figure 5:
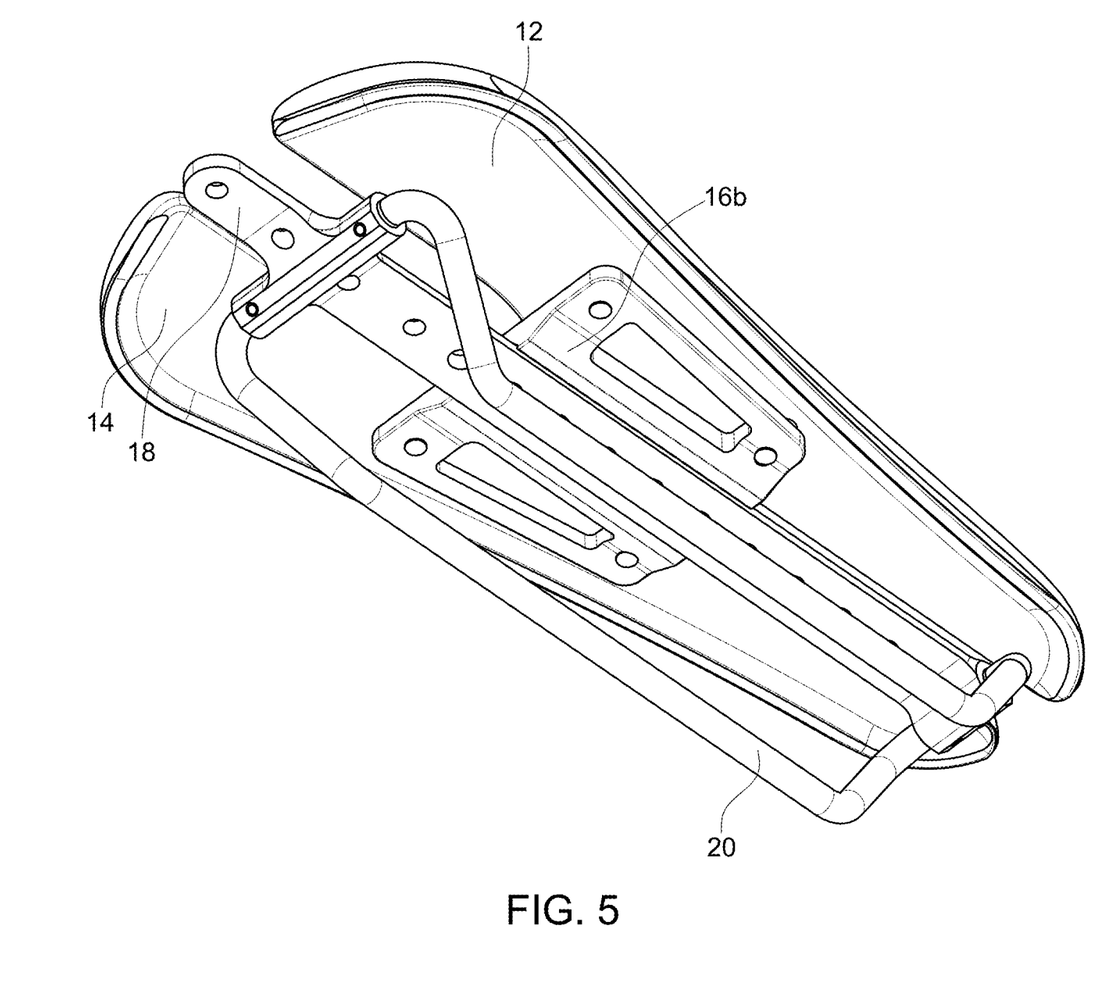
FIG. 5 is a perspective bottom view of an adjustable saddle according to a second embodiment of the present invention.

A second embodiment of the adjustable saddle is illustrated in FIGS. 4 & 5. It is substantially similar to the first embodiment except for the configuration of the mounting bracket 16b. In this embodiment, the longitudinally-extending center channel is located on the bottom of the bracket and faces downwardly. Accordingly, the main rail is received under the bracket instead of on top of the bracket. In this variation the main fastener holes 42 are threaded and the center bracket fastener holes 40 are not. Further, the center bracket fastener holes are countersunk and the main fastener holes are not. In all other respects the second embodiment is similar to the first embodiment.

A Method of Adjusting an Embodiment of an Adjustable Bicycle Saddle

The saddle can be adjusted to the particulars of a rider off or on an associated bike while attached or detached from the associated seatpost. As discussed, the saddle seat pans 12 & 14 can be adjusted both fore and aft. Further, each seat pan can be independently adjusted laterally and the nose and tail of each pan can be pivoted inwardly and outwardly relative to the other.

Concerning the setup of a typical bicycle, the longitudinal position of the saddle is typically adjustable relative to the bicycle by sliding the saddle forwardly or rearwardly along the seat rails within the seatpost mount. Accordingly, further fore and aft adjustment is only necessary wen the rider desires to substantially alter his/her riding geometry. For instance, time trial and triathletes often prefer to have their saddles located directly above or nearly directly above the crankset axle. The normal range of adjustment of the seat rails in a seatpost clamp is typically not sufficient to allow a rider of a bicycle of standard race geometry to put his saddle in such a position. This saddle allows additional fore and aft adjustments to be made.

To adjust the fore and aft position of the seat pans, the use first loosens the center mounting bracket fasteners 28 and removes them from their respective fastener holes 40 & 42. The mounting bracket 16a&b is then slid forwardly or rearwardly to a desired position wherein two corresponding main fastener holes 42 align with the two center mounting bracket fastener holes 40. The fasteners are then inserted into the paired holes and tightened in place. Loosening and tightening of the fasteners is typically accomplished with a standard socket head wrench.

Each of the left and right seat pans 12 & 14 can be independently adjusted laterally and pivotally to accommodate the specific needs and desires of a rider. To adjust the seat pans the user first removes the seat cushion assemblies 22 & 24, which are typically held in place on the seat pans by way of hook and loop 26 strip on both the top of the seat pan and the bottom of the cushion assembly. This exposes the head of the center bracket fasteners 28 as received and in the respective seat pan slots 32 & 34 of the seat pans and threadably secured to the center bracket fastener holes 36 & 38 of the mounting bracket 16a & 16b.

As desired, the fasteners 28 are loosened but not removed to permit the seat pans 12 & 14 to be moved laterally and pivotally in the respective slots 32 & 34 relative to the mounting bracket 16a & 16b. The user can pivot the noses of each pan inwardly or outwardly relative to the tail or back of the pan. Similarly, the user can pivot the tail of one or both pans inwardly or outwardly relative to the nose of each pan. Finally, the seat pans can be slid laterally inwardly and outwardly relative to the mounting bracket and the main rail increasing or decreasing the distance between the respective seat pans. As mentioned, the right and left pans can be independently adjusted allowing the resulting saddle configuration to by asymmetrical relative to the longitudinal axis of the main rail 18. Once the seat pans are positioned as desired the fasteners can be re-tightened to secure the pans in place and the cushion assemblies 22 & 24 can be fastened to the seat pans.

An Embodiment of an Accessory Water Bottle Cage Mount Assembly

Figure 9:
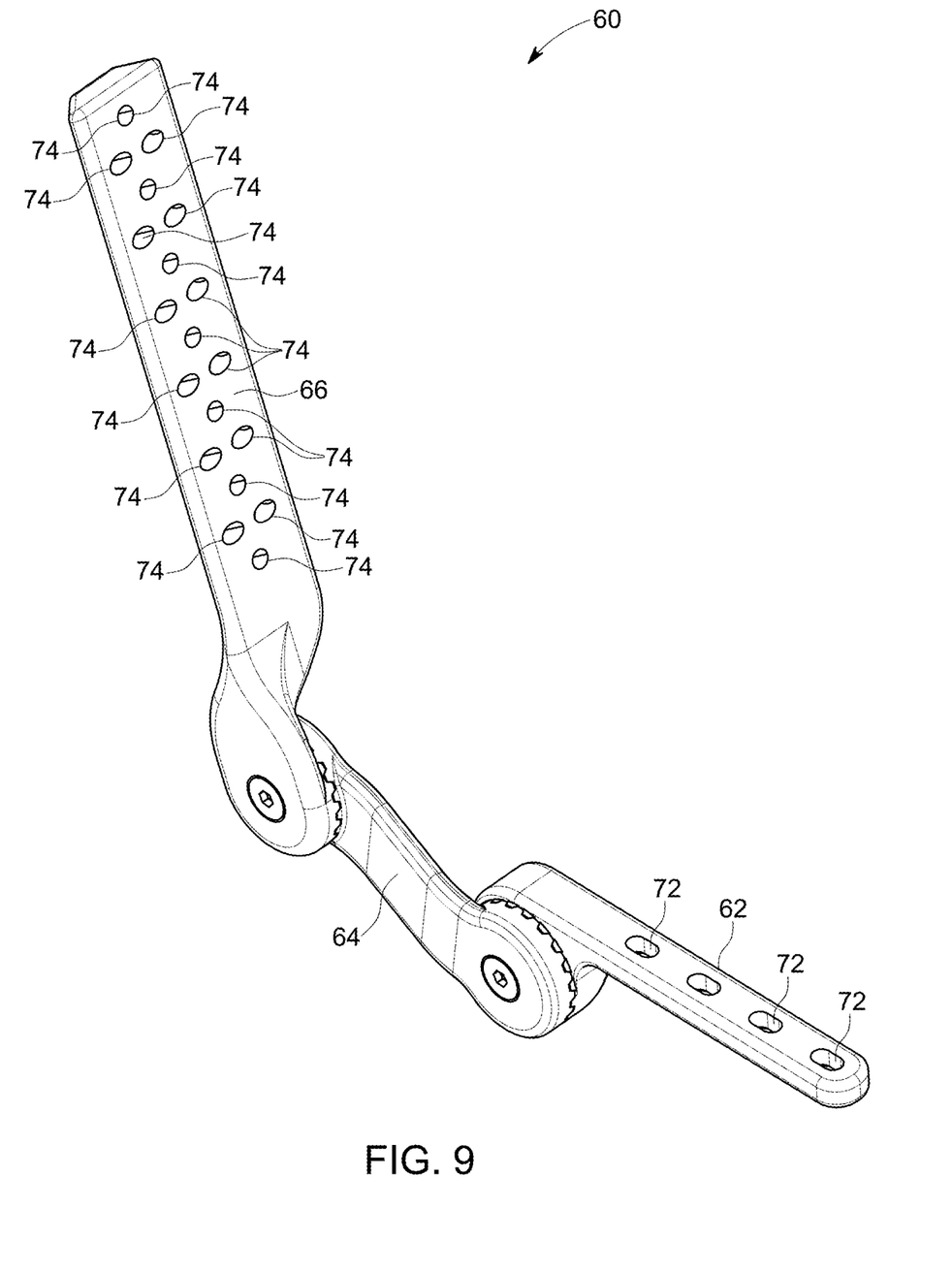
FIG. 9 is a perspective top view of the adjustable saddle including an accessory water bottle cage holder mounted to the main rail according to the first embodiment of the present invention.
Figure 10:
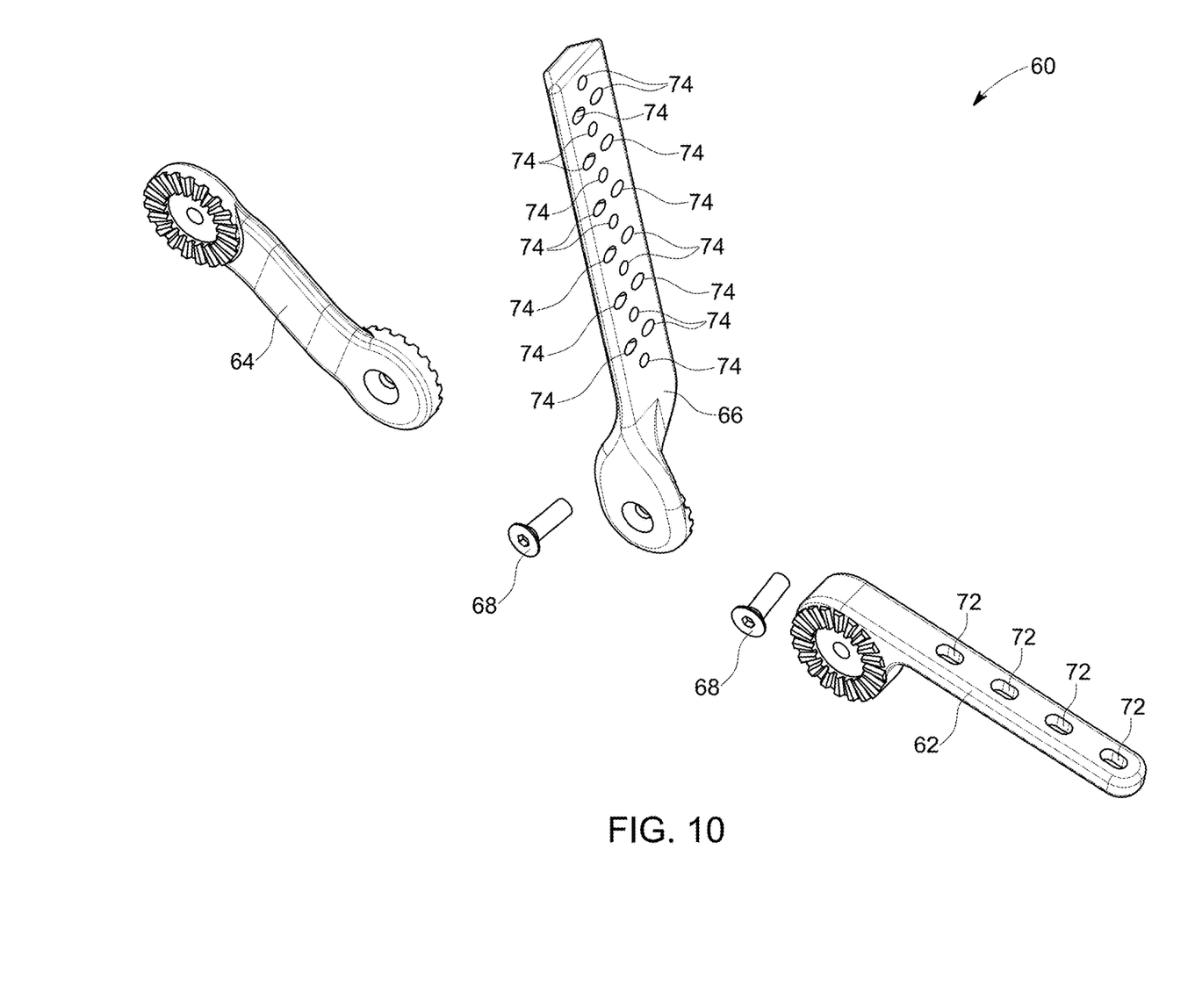
FIG. 10 is an exploded perspective view of the water bottle cage holder according to the first embodiment of the present invention.

As mentioned above, four aligned accessory mounting holes 44 are provided toward the back end of the main rail 18. These accessory mounting holes can be treaded and used to attach various accessories to the saddle including an adjustable water bottle cage mount assembly 60 as illustrated in FIGS. 9 & 10. Nominally, the assembly is designed and configured to secure a water bottle cage thereon; however, as can be appreciated other articles can also be secured to the assembly as desired, such as a tool tote or an accessory bag.

The mount assembly 60 comprises three primary components secured together with threaded fasteners 68: a saddle mounting arm 62; an adjustment arm 64; and an accessory mounting arm 66. The arms can be made of any suitable material but typically comprise a lightweight metal, such as an aluminum alloy, or a reinforced plastic, such as glass or carbon fiber reinforced nylon. The aluminum variation is typically cast or forged and the nylon variation is typically injection molded.

The saddle mounting arm 62 comprises four aligned mounting slots 72 that correspond to the accessory mounting holes 44 on the main rail. Typically, the arm is secured to the main rail with two or more threaded fasteners. The distal end of the arm comprises half of an indexed hinge comprising a radially toothed surface that interfaces with a corresponding other half to join the two halves and the parts associated therewith together at one of a plurality of rotational positions. The halves of the indexed hinge are secured together at the desired position by a threaded fastener 68.

The adjustment arm 64 comprises spaced apart ends comprising halves of indexed hinges that facilitate pivotally adjustable attachment to both the saddle mounting arm and the accessory mounting arm.

The accessory mounting arm 66 comprises a proximal end having half of an indexed hinge that mates with the hinge's other half on the distal end of the adjustment arm. In combination the two indexed hinges and three arms allow a significant amount of adjustment in placing the accessory attached to the assembly in a position desired by a rider. The mounting arm includes a plurality of mounting holes 74 distributed over its surface permitting a water bottle cage or any other suitable accessory to be mounted thereto.

VARIATIONS AND OTHER EMBODIMENTS

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. An adjustable cycle saddle comprising:
an elongated main rail having a front main end and an opposite back main end separated by a main length defining a longitudinal axis;
left and right seat rails fixedly coupled to the main rail generally proximate the front main end and the back main end;
a mounting bracket adjustably fixed to the main rail at one of a plurality of user-selected positions along the main length;
a left seat pan having a front left pan end and a rear left pan end with the left seat pan being adjustably secured to a left portion of the mounting bracket permitting the left seat pan to be adjusted both (i) laterally relative to the longitudinal axis, and (ii) pivotally moving the respective front and rear left pan ends inwardly and outwardly relative to the longitudinal axis; and
a right seat pan having a front right pan end and a rear right pan end with the right seat pan being adjustably secured to a right portion of the mounting bracket permitting the right seat pan to be adjusted both (i) laterally relative to the longitudinal axis, and (ii) pivotally moving the respective front and rear right pan ends inwardly and outwardly relative to the longitudinal axis.

2. The saddle of claim 1, further comprising a left cushion assembly and a right cushion assembly, each cushion assembly being attached to a pan top side of the respective left and right seat pans.

3. The saddle of claim 2, wherein the left and right seat cushion assemblies are secured to the respective left and right seat pans with hook and loop material.

4. The saddle of claim 1, wherein (1) the main rail further includes a plurality of spaced and aligned main fastener holes distributed along the main length, (2) the mounting bracket includes at least two center bracket fastener holes, the center bracket fastener holes being aligned with the longitudinal axis, and (3) at least two threaded center bracket fasteners received through the center bracket fastener holes and corresponding main fastener holes and threadably secured.

5. The saddle of claim 1 wherein:
the mounting bracket includes two left bracket fastener holes located to the left of the longitudinal axis, and two right bracket fastener holes located to the right of the longitudinal axis;
the left seat pan includes two laterally-elongated left seat pan slots, the left seat pan slots being aligned with the left bracket fastener holes;
the right seat pan includes two laterally-elongated right seat pan slots, the right seat pan slots being aligned with the right bracket fastener holes;
two left bracket fasteners are received through the left pan slots and the left bracket fastener holes and threadably secured; and
two right bracket fasteners are received through the right pan slots and the right bracket fastener holes and threadably secured.

6. The saddle of claim 4 wherein:
the mounting bracket includes two left bracket fastener holes located to the left of the longitudinal axis, and two right bracket fastener holes located to the right of the longitudinal axis;
the left seat pan includes two laterally-elongated left seat pan slots, the left seat pan slots being aligned with the left bracket fastener holes;
the right seat pan includes two laterally-elongated right seat pan slots, the right seat pan slots being aligned with the right bracket fastener holes;
two left bracket fasteners are received through the left pan slots and the left bracket fastener holes and threadably secured; and
two right bracket fasteners are received through the right pan slots and the right bracket fastener holes and threadably secured.

7. The saddle of claim 4 wherein:
the mounting bracket includes two left bracket fastener holes located to the left of the longitudinal axis, and two right bracket fastener holes located to the right of the longitudinal axis;
the left seat pan includes two laterally-elongated left seat pan fastener holes, the left seat pan fastener holes being aligned with the left bracket fastener holes;
the right seat pan includes two laterally-elongated right seat pan fastener holes, the right seat pan fastener holes being aligned with the right bracket fastener holes;
two left bracket fasteners are received through the left pan fastener holes and the left bracket fastener holes and threadably secured;
two right bracket fasteners are received through the right pan fastener holes and the right bracket fastener holes and threadably secured;
one of the left pan fastener holes and the left bracket fastener holes comprise laterally-extending slots; and
one of the right pan fastener holes and the right bracket fastener holes comprise laterally-extending slots.

8. The saddle of claim 4, wherein the main rail further includes a plurality of accessory mounting holes extending linearly and in line with the aligned main fastener holes.

9. The saddle of claim 1, wherein the mounting bracket is secured to a bottom side of the main rail.

10. The saddle of claim 1, wherein the mounting bracket is secured to a top side of the main rail.

11. The saddle of claim 1, wherein the left and right seat rail comprise a single piece.

12. The saddle of claim 1, wherein the main rail includes laterally extending front and rear sleeves, the sleeves each having an inside diameter sized to receive the seat rails therein.

13. The saddle of claim 12, wherein the seat rails are affixed in place within the front and rear sleeves by way of either or both set pins and set screws.

14. The saddle of claim 8 in combination with an adjustable accessory mount, the accessory mount being attached to the accessory mounting holes with two or more accessory fasteners.

15. The combination of claim 14, wherein the accessory mount comprises first, second and third arms with the first arm configured to mount to the main rail, the third arm configured to have an accessory attached to it, and the third arm pivotal attached to the first and third arms at opposing ends thereof.

16. The saddle of claim 1, wherein the mounting bracket and main rail are comprised of one or more of aluminum, reinforced plastic, carbon fiber composite, steel, and titanium.

17. A method of adjusting the saddle of claim 1, the method comprising:
   moving the left seat pan laterally and pivotally relative to the mounting bracket to a desired second left seat pan position from a first left seat pan position and securing the left seat pan in place relative to the mounting bracket; and
   moving the right seat pan laterally and pivotally relative to the mounting bracket to a desired second right seat pan position from a first right seat pan position and securing the right seat pan in place relative to the mounting bracket.

18. The method of claim 17 further comprising moving the mounting bracket along the length of the main rail from a first mounting bracket position to a desired second mounting bracket position, and securing the mounting bracket in place on the main rail.

19. A method of adjusting the saddle of claim 7, the method comprising:
   loosening and removing the center bracket fasteners from the associated two main fastener holes to free the mounting bracket from the main rail;
   moving the mounting bracket to a new position on the main rail and aligning the center bracket fastener holes with the center bracket main fastener holes at the new location;
   placing the center bracket fasteners through the aligned center bracket fastener and main fastener holes and threadably securing the center bracket fasteners in place;
   loosening the two left bracket fasteners;
   moving the left seat pan laterally and pivotally relative to the mounting bracket into a desired position;
   tightening the two left bracket fasteners to secure the left seat pan in the desired position;
   loosening the two right bracket fasteners;
   moving the right seat pan laterally and pivotally relative to the mounting bracket into a desired position; and
   tightening the two right bracket fasteners to secure the right seat pan in the desired position.

20. An adjustable cycle saddle comprising:
   an elongated main rail having a front main end and an opposite back main end separated by a main length defining a longitudinal axis, the main rail further includes a plurality of spaced and aligned main fastener holes distributed along the main length;
   left and right seat rails fixedly coupled to the main rail generally proximate the front main end and the back main end;
   a mounting bracket including (i) at least two center bracket fastener holes, the center bracket fastener holes being aligned with the longitudinal axis, (ii) two left bracket fastener holes located to the left of the longitudinal axis, and (iii) two right bracket fastener holes located to the right of the longitudinal axis wherein at least two threaded center bracket fasteners received through the center bracket fastener holes and corresponding main fastener holes and threadably secured to adjustably affix the mounting bracket to the main rail;
   a left seat pan having a front left pan end, a rear left pan end with the left seat pan and two laterally-elongated left seat pan fastener holes, the left seat pan fastener holes being aligned with the left bracket fastener holes being adjustably secured to a left portion of the mounting bracket wherein one of the set of two left pan fastener holes and the set of two left bracket fastener holes comprise laterally-extending slots permitting the left seat pan to be adjusted both (i) laterally relative to the longitudinal axis, and (ii) pivotally moving the respective front and rear left pan ends inwardly and outwardly relative to the longitudinal axis;
   a right seat pan having a front right pan end, a rear right pan end with the right seat pan and two laterally-elongated right seat pan fastener holes, the right seat pan fastener holes being aligned with the right bracket fastener holes being adjustably secured to a right portion of the mounting bracket wherein one of the set of two right pan fastener holes and the set of two right bracket fastener holes comprise laterally-extending slots permitting the right seat pan to be adjusted both (i) laterally relative to the longitudinal axis, and (ii) pivotally moving the respective front and rear right pan ends inwardly and outwardly relative to the longitudinal axis; and
   a left cushion assembly and a right cushion assembly, each cushion assembly being attached to a pan top side of the respective left and right seat pans.

* * * * *